United States Patent Office 3,732,295
Patented May 8, 1973

---

3,732,295
TRIMETHOXYBENZOYL-AMINOALKANOIC ACIDS
Franco Dompe', Milan, Italy, assignor to Dompe' Farmaceutici S.p.A., Milan, Italy
No Drawing. Filed Jan. 28, 1970, Ser. No. 6,585
Claims priority, application Italy, Nov. 25, 1969, 24,863/69
Int. Cl. C07c *103/12*
U.S. Cl. 260—519  3 Claims

ABSTRACT OF THE DISCLOSURE

Trimethoxybenzoyl-aminoalkanoic acids of general formula

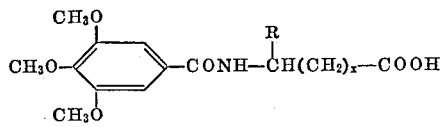

wherein $x$ is an integer from 1 to 5 and R is an alkyl group having 1 to 3 carbon atoms and their derivatives are prepared by reacting 3,4,5-trimethoxybenzoic acid chloride with an aminoalkanoic acid at a temperature between —5 and +5° C. The compounds are useful in the treatment of heart infarct.

---

This invention refers to novel trimethoxybenzoyl-aminoalkanoic acids of general formula:

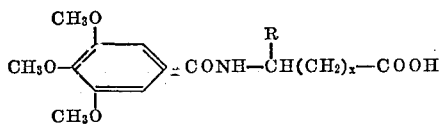

wherein $x$ is an integer from 1 to 5 and R is an alkyl group having 1 to 3 carbon atoms, and refers to derivatives of said acids, and more specifically to the sodium salt of said acids.

An object of this invention is said acids and their derivatives. Another object of this invention is a process for synthesizing such compounds. Still another object is the employment of said compounds in the treatment of heart infarct.

The compounds of this invention are prepared by reacting 3,4,5-trimethoxybenzoic acid chloride and an aminoalkanoic acid at a temperature between —5° and +5° C. The products are obtained in good yield and are purified by means of conventional well-known methods.

Typical compounds of this invention are 3,4,5-trimethoxybenzoyl-β-aminobutyric acid, 3,4,5-trimethoxybenzoyl-γ-aminovaleric acid and 3,4,5-trimethoxybenzoyl-δ-aminocaproic acid and their salts which are acceptable from a pharmaceutical point of view.

The process for preparing the compounds of the present invention is shown by the following examples, which are merely illustrative and not limitative of the invention.

EXAMPLE I 26.2 g. of δ-aminocaproic acid was dissolved in 30 ml. H₂O and neutralized with 12.2 g. NaOH dissolved in 30 ml. H₂O. The mixture was cooled to 0.5° C. and 36 g. 3,4,5-trimethoxybenzoic acid chloride were added under stirring while keeping the temperature between 0° and 5° C. The solution was treated with carbon, filtered and acidified with diluted HCl to Congo red. The precipitate was filtered off, dried and crystallized from ethanol. 44 g. product (yield 90%) with a M.P. of 125–126° C. was obtained.

EXAMPLE II

By a procedure like that of Example I, the corresponding salt of 3,4,5-trimethoxy-γ-aminovaleric acid was produced by employing γ-aminovaleric acid instead of δ-aminocaproic acid. The product melted at 155–157° C.

The caproic derivative of Example I is the preferred product of this invention and it will be referred to hereinafter by the code designation DF 339.

As has been stated before, the compounds herein considered are useful in the treatment of infarction cases, and, more specifically, their administration is active in the prevention of an infarct as indicated by the symptoms of an overhanging crisis, or it attenuates the consequent symptoms.

First of all, it is noteworthy that the compounds of this invention are scarcely toxic and that in the clinical tests no side effects have been observed. The acute toxicity of DF 339 considered as representative of the compounds of this invention, has been evaluated by administering the sodium salt to female rats weighing about 100 g. The $LD_{50}$ was of about 5 g. per kg. of body weight, the maximum which could be administered.

In the case of intraperitoneal administeration, the $LD_{50}$ was 3.5 g. per kg. body weight.

In the case of continuous intravenous infusion, in an amount of 1 g. per kg. body weight per minute, up to a maximum dose of 3 g. per kg. body weight, death occurred in 2 of 15 animals.

For female mice weighing about 20 g., the $LD_{50}$, intraperitoneally was >2.5 and 3.0 g. per kg.; by mouth, the $LD_{50}$ was about 5 g. per kg. By continuous intravenous infusion, in an amount of 0.2 ml. per minute (4 g. per kg. and per minute), with the total dose being about 2.5 g. per kg., DF 339 caused death in about 50% of the animals.

As to the tolerability, tests were made on female mice by administering to 30 animals during 33 days a daily dose of 500 mg. per kg. (5% solution) by mouth and a dose of 300 mg. per kg. (6% solution) intraperitoneally. No deaths, no variation of body weight, no liver alterations, no alterations of kidneys, of adrenal glands, of spleen, of heart and of ovaries were observed.

Pharmacological studies showed that DF 339 exerts its action on the heart.

The chief effect on the heart is the prevention of electrocardiographic alterations in rats and in rabbits upon intravenous injection of 1–2 units of Pitressin.

As to its action on the heart, in a specific case of infraction. DF 339 was tested on rabbits by provoking artificially an infarction by means of the ligature of the descending coronary artery. In another group, the administration was begun at the first infarction symptoms. Another group served as a control. The following results were obtained:

|  | Total | Number of dead |
|---|---|---|
| Control | 32 | 15 |
| Treated before infarction | 20 | 2 |
| Treated at infarction | 6 | 0 |

The amount of infarction was followed daily by an electrodiogram. The infarction gravity was judged by the presence of a QS (infarct) in two precordial branches and at least in a peripheral one. The infarction was less severe in the treated animals than in the controls.

The compounds of this invention attenuate some of the symptoms of physiological changes caused by an infarction.

DF 339, as prepared in Example I, was tested in 20 cases of ischemic heart diseases caused by coronary occlusion, in arrhythmies and in disturbances of the stimulus transmission, at doses of 4 to 8 g. daily for 7-8 days.

In cases of coronary insufficiency, an improvement in the strain tolerability, as evidenced by the reduction of the number and the intensity of stenocardiac attacks, was observed.

In cases of infarction, a favorable response was obtained, especially when the treatment was begun soon after the arising of the infarction.

Cases of extrasystolic arrhythmy showed rhythm improvements upon a DF 339 treatment.

Cases of disturbances of the atrioventricular and intraventricular transmission of stimulus showed an improvement upon DF 339 administration.

I claim:
1. A compound of the formula

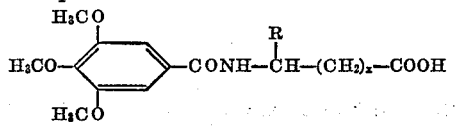

in which $x$ is an integer from 1 to 5 and R is alkyl having 1 to 3 carbon atoms, and the pharmacologically acceptable salts thereof.

2. A compound according to claim 1 selected from the group consisting of 3,4,5 - trimethoxybenzoyl - β-aminobutyric acid, 3,4,5-trimethoxybenzoyl-γ-aminovaleric acid and 3,4,5-trimethoxybenzoyl-δ-aminocaproic acid.

3. A compound according to claim 1 in which said salt is a sodium salt.

References Cited
UNITED STATES PATENTS 3,364,249    1/1968    Bolhofer _____ 260—519

LORRAINE A. WEINBERGER, Primary Examiner

L. A. THAXTON, Assistant Examiner

U.S. Cl. X.R.

260—404; 424—318, 319